United States Patent
Yao et al.

(10) Patent No.: US 12,067,763 B2
(45) Date of Patent: Aug. 20, 2024

(54) THREE-DIMENSIONAL POINT CLOUD LABEL LEARNING ESTIMATION DEVICE, THREE-DIMENSIONAL POINT CLOUD LABEL LEARNING ESTIMATION METHOD, AND 3D POINT CLOUD LABEL LEARNING ESTIMATION PROGRAM

(71) Applicant: NIPPON TELEGRAPH AND TELEPHONE CORPORATION, Tokyo (JP)

(72) Inventors: Yasuhiro Yao, Tokyo (JP); Hitoshi Niigaki, Tokyo (JP); Kana Kurata, Tokyo (JP); Kazuhiko Murasaki, Tokyo (JP); Shingo Ando, Tokyo (JP); Atsushi Sagata, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 343 days.

(21) Appl. No.: 17/612,373

(22) PCT Filed: May 23, 2019

(86) PCT No.: PCT/JP2019/020452
§ 371 (c)(1),
(2) Date: Nov. 18, 2021

(87) PCT Pub. No.: WO2020/235079
PCT Pub. Date: Nov. 26, 2020

(65) Prior Publication Data
US 2022/0222933 A1   Jul. 14, 2022

(51) Int. Cl.
*G06V 10/82*   (2022.01)
*G06N 3/08*   (2023.01)
(Continued)

(52) U.S. Cl.
CPC ............... *G06V 10/82* (2022.01); *G06N 3/08* (2013.01); *G06V 10/40* (2022.01); *G06V 10/762* (2022.01)

(58) Field of Classification Search
CPC ...... G06V 10/762; G06V 10/82; G06V 10/40; G06N 3/08; G06N 3/045; G06N 20/00;
(Continued)

(56) References Cited

U.S. PATENT DOCUMENTS 9,251,399 B2 * 2/2016 Hwang ...................... G06T 7/11
10,504,003 B1 * 12/2019 Flowers ................. G06V 20/41
(Continued)

FOREIGN PATENT DOCUMENTS

JP   20174480 A   1/2017
JP   20193527 A   1/2019

OTHER PUBLICATIONS

Landrieu et al. (2018) "Large-Scale Point Cloud Semantic Segmentation with Superpoint Graphs" 2018 IEEE/CVF Conference on Computer Vision and Pattern Recognition, Jun. 18, 2018.
(Continued)

*Primary Examiner* — Congvan Tran

(57) ABSTRACT

A three-dimensional point cloud label learning and estimation device includes: a clustering unit that clusters a three-dimensional point cloud into clusters; a learning unit that makes a neural network learn to estimate a label corresponding to an object to which points contained in each of the clusters belong; and an estimation unit that estimates a label for the cluster using the neural network learned at the learning unit. In the three-dimensional point cloud label learning and estimation device, the neural network uses a total sum of sigmoid function values (sum of sigmoid) when performing feature extraction on the cluster.

15 Claims, 7 Drawing Sheets

(51) Int. Cl.
*G06V 10/40* (2022.01)
*G06V 10/762* (2022.01)

(58) Field of Classification Search
CPC .... G06F 18/253; G06F 18/2413; G06F 18/23; G06T 7/00
See application file for complete search history.

(56) References Cited

U.S. PATENT DOCUMENTS

| | | | | |
|---|---|---|---|---|
| 10,699,167 | B1* | 6/2020 | Dowdall | G06F 18/2178 |
| 2007/0219720 | A1* | 9/2007 | Trepagnier | B60W 30/00 |
| | | | | 701/300 |
| 2011/0187723 | A1* | 8/2011 | Chen | G06T 13/20 |
| | | | | 345/473 |
| 2012/0254179 | A1* | 10/2012 | Cao | G06Q 30/02 |
| | | | | 707/E17.089 |
| 2016/0358035 | A1 | 12/2016 | Ruan et al. | |
| 2019/0145765 | A1* | 5/2019 | Luo | G06V 10/764 |
| | | | | 702/153 |
| 2022/0139094 | A1* | 5/2022 | Yoshimi | G06V 10/26 |
| | | | | 382/173 |
| 2023/0260216 | A1* | 8/2023 | Niigaki | G06T 19/00 |
| | | | | 345/419 |

OTHER PUBLICATIONS

Qi et al. (2017) "PointNet: Deep Learning on Point Sets for 3DClassification and Segmentation" 2017 IEEE Conference on Computer Vision and Pattern Recognition (CVPR), Jul. 21, 2017, pp. 77-85.

Niigaki et al. (2018) "Detection of outdoor cables from point-cloud measured by MMS—Classification method of elongated object using histogram feature based on multiple geometric directions(MGPFH)" IEICE Technical Report, vol. 117, No. 443, pp. 83-87.

* cited by examiner

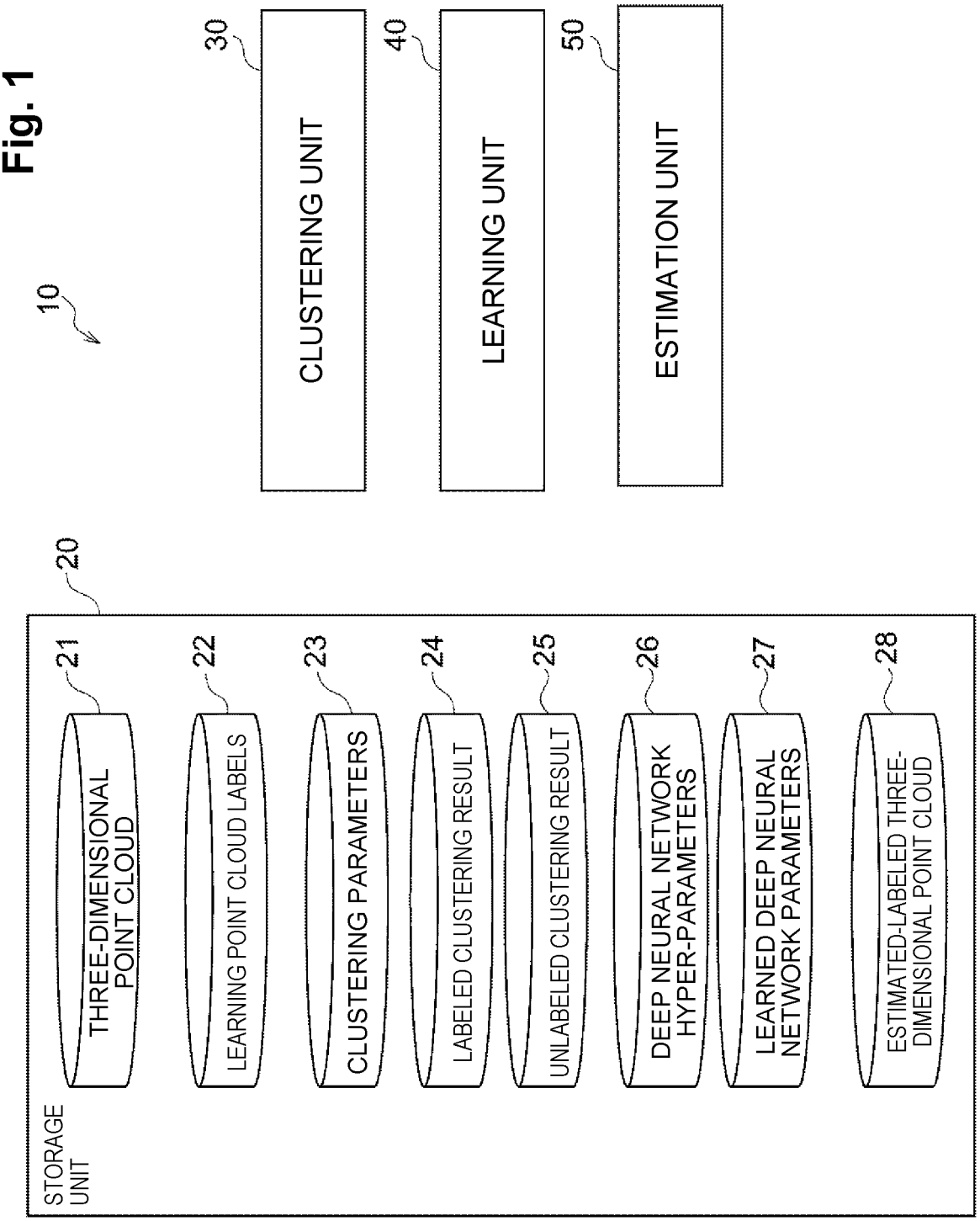

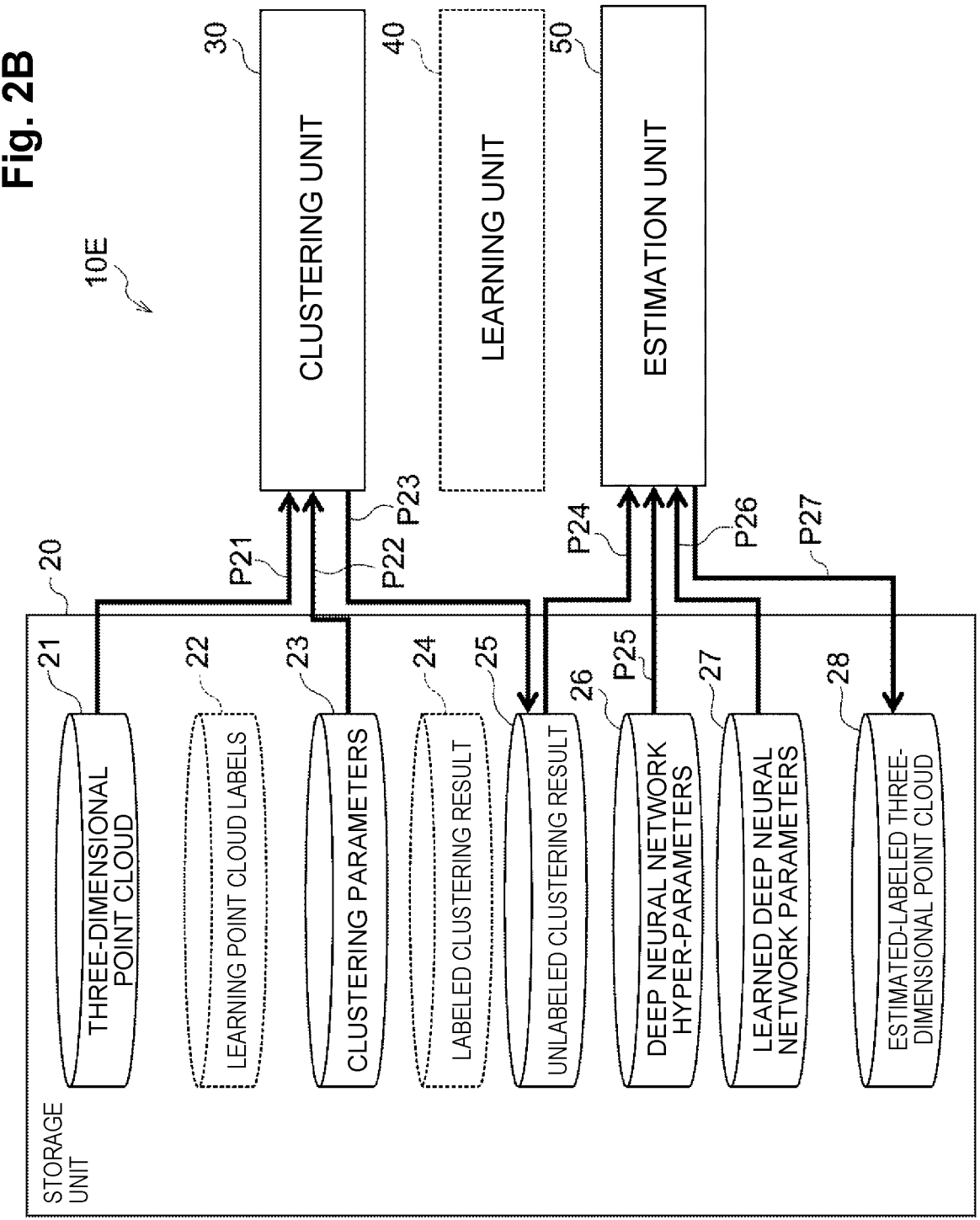

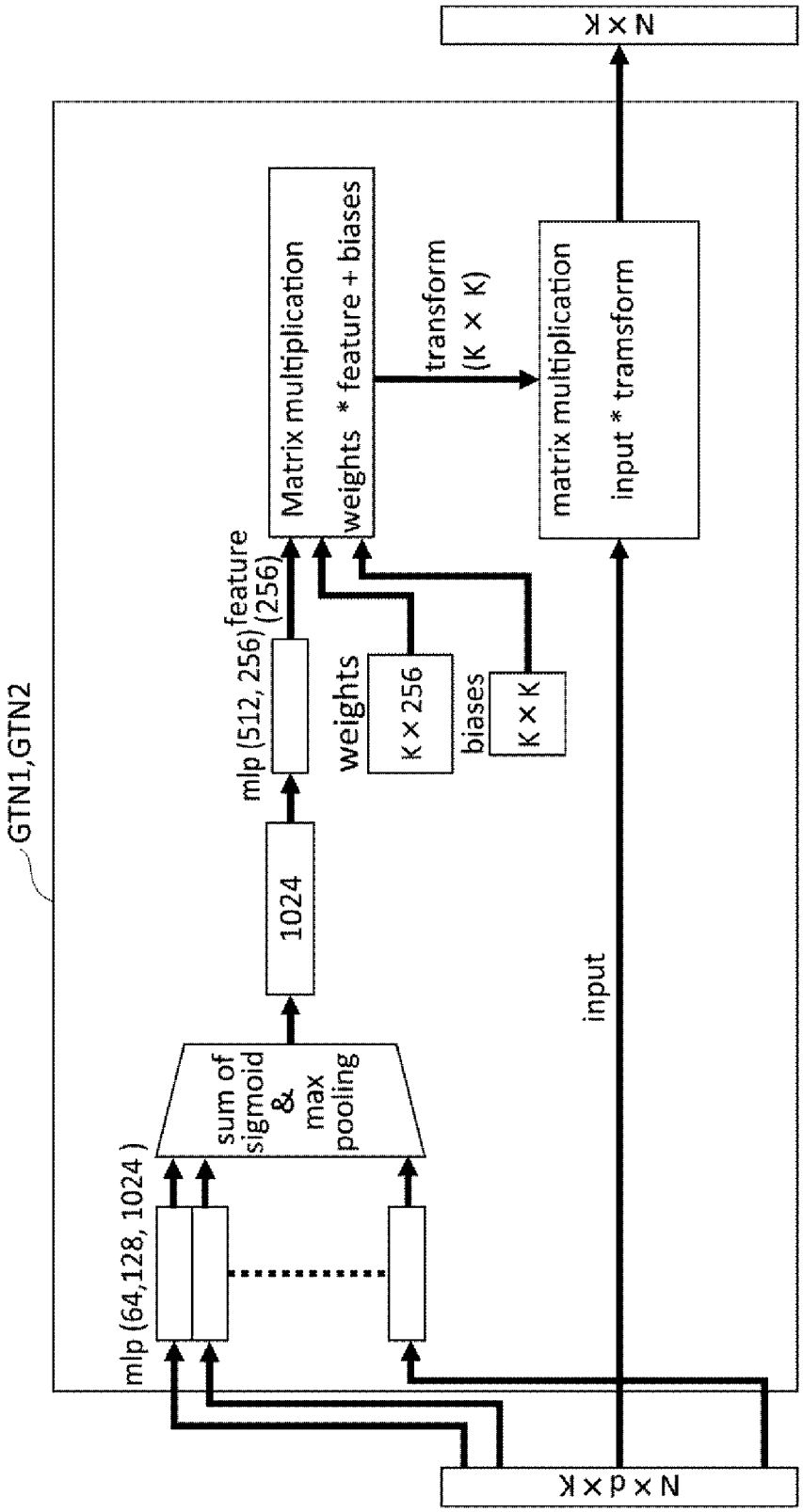

THREE-DIMENSIONAL POINT CLOUD LABEL LEARNING ESTIMATION DEVICE, THREE-DIMENSIONAL POINT CLOUD LABEL LEARNING ESTIMATION METHOD, AND 3D POINT CLOUD LABEL LEARNING ESTIMATION PROGRAM

CROSS-REFERENCE TO RELATED APPLICATIONS

This application is a U.S. National Stage Application filed under 35 U.S.C. § 371 claiming priority to International Patent Application No. PCT/JP2019/020452, filed on 23 May 2019, the disclosure of which is hereby incorporated herein by reference in its entirety.

TECHNICAL FIELD

The disclosed technique relates to a three-dimensional point cloud label learning and estimation device, a three-dimensional point cloud label learning and estimation method, and a three-dimensional point cloud label learning and estimation program.

BACKGROUND ART

Data with position information in three dimensions (x, y, z) and a certain number of pieces of attribute information is called a three-dimensional point, and data for a collection of three-dimensional points is called a three-dimensional point cloud. A three-dimensional point cloud is data showing geometrical information of objects and can be acquired through measurement with a distance sensor or reconstruction of an image into three dimensions. Attribute information of points refers to information other than the position information that is acquired in measurement of a point cloud, such as reflection intensities of points (intensity values) or color information (RGB values).

There have been proposals of techniques for assigning an object label to each point in a target three-dimensional point cloud by clustering (dividing) the three-dimensional point cloud into clusters (small regions) and identifying a three-dimensional point cloud for each cluster.

For example, Patent Literature 1 describes a technique that clusters a three-dimensional point cloud and then assigns labels according to histogram feature values for each cluster. Non-Patent Literature 1 presents an approach that clusters a three-dimensional point cloud and assigns labels to each cluster with a classifier that has been learned via deep learning.

CITATION LIST

Patent Literature

Patent Literature 1: Japanese Patent Laid-Open No. 2019-3527

Non-Patent Literature

Non-Patent Literature 1: Landrieu, Loic, and Martin Simonovsky, "Large-Scale Point Cloud Semantic Segmentation with Superpoint Graphs", 2018 IEEE/CVF Conference on Computer Vision and Pattern Recognition, 2018
Non-Patent Literature 2: R. Q. Charles, H. Su, M. Kaichun, and L. J. Guibas, "PointNet: Deep Learning on Point Sets for 3D Classification and Segmentation", 2017 IEEE Conference on Computer Vision and Pattern Recognition (CVPR), United States, 2017, pp. 77-85

SUMMARY OF THE INVENTION

Technical Problem

The technique described in Patent Literature 1 identifies point clouds based on histogram feature values designed by a human. It has been recently reported in many fields that feature values acquired by deep learning have higher identification performance than feature values designed by a human. The Patent Literature 1 can potentially have limited accuracy because it does not employ feature values acquired by deep learning.

The technique described in Non-Patent Literature 1 is expected to provide higher accuracy than with human-designed features by learning a classifier via deep learning. The technique, however, is not suited for identifying a shape having a low number of points with features that can be representative points, due to the fact that shape features (such as a normal of each point) determined through correlation of three-dimensional point positions are not explicitly utilized for identification and the fact that max pooling processing is implemented in a feature value extraction layer of a neural network.

The present disclosure is aimed at enabling accurate assignment of labels to a point cloud containing relatively homogenous points with a low number of points that can be representative points.

Means for Solving the Problem

A first aspect of the present invention is a three-dimensional point cloud label learning and estimation device including: a clustering unit that clusters a three-dimensional point cloud into clusters; a learning unit that makes a neural network learn to estimate a label corresponding to an object to which points contained in each of the clusters belong; and an estimation unit that estimates a label for the cluster using the neural network learned at the learning unit. The neural network uses a total sum of sigmoid function values (sum of sigmoid) when performing feature extraction on the cluster.

A second aspect is the three-dimensional point cloud label learning and estimation device according to the first aspect, wherein the clustering unit outputs three-dimensional attribute information for the points contained in the cluster and attribute information for a scalar of the cluster, and the neural network is configured to use the three-dimensional attribute information for the points contained in the cluster and the attribute information for the scalar of the cluster as input information, and subject the three-dimensional attribute information for the points contained in the cluster to geometric transformation.

A third aspect is a three-dimensional point cloud label learning and estimation device including: a clustering unit that clusters a three-dimensional point cloud into clusters; a learning unit that makes a neural network learn to estimate a label corresponding to an object to which points contained in each of the clusters belong; and an estimation unit that estimates a label for the cluster using the neural network learned at the learning unit. The clustering unit outputs three-dimensional attribute information for the points contained in the cluster and attribute information for a scalar of the cluster. The neural network is configured to take as input the three-dimensional attribute information for the points contained in the cluster and the attribute information for a scalar of the cluster output by the clustering unit, and subject the three-dimensional attribute information for the points contained in the cluster to geometric transformation.

A fourth aspect is the three-dimensional point cloud label learning and estimation device according to the second or the third aspect, wherein the three-dimensional attribute information is a normal direction and a direction of extrusion of each of the points contained in the cluster.

A fifth aspect is the three-dimensional point cloud label learning and estimation device according to any one the first through the fourth aspects, wherein during learning, the clustering unit outputs a labeled clustering result by performing clustering on a three-dimensional point cloud with application of learning point cloud labels and clustering parameters, the learning point cloud labels being labels previously assigned to respective points in the three-dimensional point cloud, and during estimation, the clustering unit performs clustering on a target three-dimensional point cloud with application of the clustering parameters, and outputs an unlabeled clustering result. The learning unit uses the labeled clustering result and deep neural network hyper-parameters to learn label estimation parameters for estimating labels to be assigned to respective clusters that result from the clustering at the clustering unit, and outputs learned deep neural network parameters. The estimation unit estimates a label for each cluster in the unlabeled clustering result by using the unlabeled clustering result, the deep neural network hyper-parameters, and the learned deep neural network parameters output by the learning unit.

A sixth aspect is a three-dimensional point cloud label learning and estimation method including, by a computer: clustering a three-dimensional point cloud into clusters; making a neural network learn to estimate a label corresponding to an object to which points contained in each of the clusters belong; and estimating a label for the cluster using the learned neural network. The neural network uses a total sum of sigmoid function values (sum of sigmoid) when performing feature extraction on the cluster.

A seventh aspect is a program for causing a computer to execute three-dimensional point cloud label learning and estimation processing including: clustering a three-dimensional point cloud into clusters; making a neural network learn to estimate a label corresponding to an object to which points contained in each of the clusters belong; and estimating a label for the cluster using the learned neural network. The neural network uses a total sum of sigmoid function values (sum of sigmoid) when performing feature extraction on the cluster.

Effects of the Invention

According to the present disclosure, labels can be accurately assigned to a point cloud containing relatively homogenous points with a low number of points that can be representative points.

BRIEF DESCRIPTION OF DRAWINGS

FIG. 1 is a block diagram showing an example of functional configuration of a three-dimensional point cloud label learning and estimation device according to an embodiment.

FIG. 2B is a block diagram showing an example of functional configuration of a three-dimensional point cloud label estimation device according to an embodiment.

FIG. 4 is a conceptual diagram showing an exemplary structure of a geometric transformation network as a portion of the deep neural network according to an embodiment.

DESCRIPTION OF EMBODIMENTS

Figure 2A:
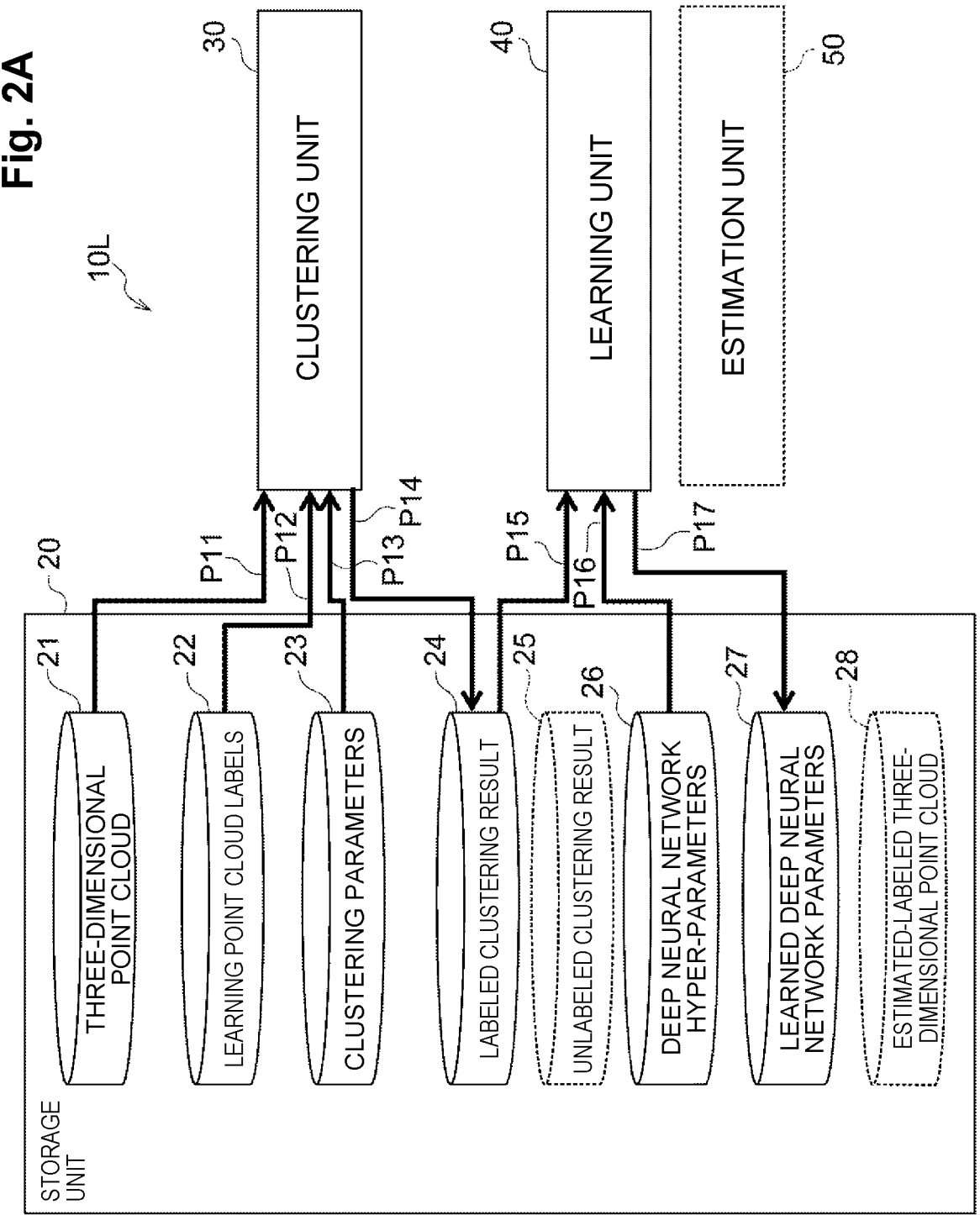
FIG. 2A is a block diagram showing an example of functional configuration of a three-dimensional point cloud label learning device according to an embodiment.

A three-dimensional point cloud label learning and estimation device according to an embodiment of the present invention takes a three-dimensional point cloud as input and estimates a label of each point from position information and attribute information of each of the points contained in the three-dimensional point cloud. The three-dimensional point cloud label learning and estimation device according to this embodiment also performs learning for implementing label estimation functionality with a three-dimensional point cloud label learning and estimation device 10. In the following, a three-dimensional point cloud is also called a point cloud.

Attribute information of a point can include the reflection intensity of the point (intensity value), color information (RGB values) and the like, but attribute information is not limited to them in this embodiment.

A label indicates to what kind of object a point belongs. As an example, for a point cloud resulting from measurement of an urban area, labels indicating buildings, roads, trees, signs and the like are present as an example; however, labels are not limited to them in this embodiment. A user can set labels as desired.

This embodiment is directed to a large-scale point cloud that is not limited in the number of points contained in the point cloud and spatial range of the point cloud. For example, for a point cloud resulting from measurement of an urban area, the number of points contained in the point cloud will be high and the spatial range of the point cloud will be large when the area of a measured range is large.

Now referring to the drawings, an example of the embodiment is described.

FIG. 1 is a block diagram showing an example of functional configuration of the three-dimensional point cloud label learning and estimation device 10 according to this embodiment. As shown in FIG. 1, the three-dimensional point cloud label learning and estimation device 10 of this embodiment includes a storage unit 20, a clustering unit 30, a learning unit 40, and an estimation unit 50.

The storage unit 20 stores a three-dimensional point cloud 21, learning point cloud labels 22, clustering parameters 23, a clustering result (a labeled clustering result 24 during learning and an unlabeled clustering result 25 during estimation), deep neural network hyper-parameters 26, learned deep neural network parameters 27, and an estimated-labeled three-dimensional point cloud 28.

The three-dimensional point cloud label learning and estimation device 10 in this embodiment functions as a three-dimensional point cloud label learning device during learning and as a three-dimensional point cloud label estimation device during estimation.

FIG. 2A is a block diagram showing an example of functional configuration of a three-dimensional point cloud label learning device 10L according to this embodiment.

The three-dimensional point cloud label learning device 10L in learning differs from the three-dimensional point cloud label learning and estimation device 10 of FIG. 1 in that it does not include the estimation unit 50, the unlabeled clustering result 25, and the estimated-labeled three-dimensional point cloud 28.

During learning, the clustering unit 30 in this embodiment takes as input the three-dimensional point cloud 21, the learning point cloud labels 22 which are assigned in advance to the respective points in the three-dimensional point cloud and the clustering parameters 23 (procedural steps P11, P12 and P13), clusters (divides) the three-dimensional point cloud 21 into multiple clusters (regions), and outputs the labeled clustering result 24 including the three-dimensional points constituting a cluster, attributes of each point such as the normal, and a correct label for the cluster, for each of the clusters resulting from clustering (procedural step P14).

Note that the learning point cloud labels 22 are input only during learning and is not input during estimation. The clustering parameters 23 are parameters dependent on a clustering scheme being applied.

The learning unit 40 in this embodiment takes as input the labeled clustering result 24 and the deep neural network hyper-parameters 26 (procedural steps P15 and P16), and performs learning of the learned deep neural network parameters 27 of a deep neural network for estimating labels from an unlabeled clustering result which indicates the attributes and positions of three-dimensional points belonging to a cluster (procedural step P17).

The clustering unit 30 in this embodiment carries out clustering of a three-dimensional point cloud by similar processing to that performed by a clustering unit of Patent Literature 1 as an example. With the processing performed by the clustering unit of Patent Literature 1, points belonging to each cluster (including attributes that are inherently possessed by the input three-dimensional point cloud) as a clustering result and a normal direction and a direction of extrusion of each point are obtained as the output. The normal direction and the direction of extrusion are each a three-dimensional vector with its square norm being 1.

During learning, individual labels are counted according to learning labels for the points constituting each cluster, and if the proportion of the label of the highest number is equal to or greater than a predefined threshold (e.g., a value of 80), that label is assigned to the cluster. If the number is less than the threshold, a label "others" is assigned.

The points in each cluster (including attributes that are inherently possessed by the input three-dimensional point cloud), the normal direction and direction of extrusion of each point and the label of the cluster thus derived are saved as a clustering result. To prevent cancellation of significant digits in computer processing, information on the points constituting each cluster is held as center coordinates of the cluster and a difference of each point from the cluster center. In this embodiment, a cluster is data having the following information:

(D1) center: average values of the coordinates (x, y, z) of three-dimensional points constituting the cluster.

(D2) positions: the (x, y, z) coordinates of each point position belonging to the cluster, with center being the origin.

(D3) point_attributes: attribute information (intensity, RGB, etc.) for a scalar of a point belonging to the cluster included in input data. The number of attributes included in point_attributes is represented as a.

(D4) cluster_attributes: attribute information of a scalar for each of the clusters resulting from clustering processing. For example, when a travel path of a vehicle has been acquired with measurement of a three-dimensional point cloud, a distance of the position of center from the nearest point in the travel path on an x-y plane (distance_xy) and a distance in z-direction (distance_z) are attribute information. Also, the number of points contained in the cluster (num_of_points) is attribute information. Any other feature values obtained for the cluster are included. The number of attributes included in cluster_attributes is represented as b.

(D5) 3d_attributes: three-dimensional attribute information for each point as geometrical information. The normal direction and the direction of extrusion are included in this attribute information. Other attributes such as an eigenvector of the cluster may be included. The number of attributes included in 3d_attributes is represented as c.

(D6) (Only in learning) label: correct label information for each cluster. Labels of the points constituting the cluster are retrieved with reference to the learning point cloud labels and the label to which the largest number of points belong in the cluster is set as label. However, if the largest number of labels of points constituting the cluster is less than a threshold proportion of the number of points constituting the cluster, the label "others" is assigned. The threshold is 80%, for example. Assume that there are k kinds of labels including "others", with label being an integer of $0, 1, \ldots, k-1$.

The unlabeled clustering result 25, which is obtained during estimation, is data including information (D1) to (D5) and not including information (D6).

Assume that the labeled clustering result 24 includes M clusters.

The learning unit 40 takes as input the labeled clustering result 24 and the deep neural network hyper-parameters 26, performs learning of a deep neural network for estimating label from a clustering result excluding the label (D6), and outputs it as the learned neural network parameters 27.

In the following, it is assumed that M clusters resulting from processing by the clustering unit 30 are divided into M_1 learning data sets and M_2 validation data sets. In this case, $M\_1+M\_2=M$. While M_1 and M_2 may be freely set, typically M_1 is set to a number about 0.8 to 0.9 times M.

The deep neural network hyper-parameters 26 are a parameter set that defines a way of learning a deep neural network, including information (1 to 8) shown below. Inside of parentheses represents a variable name.

(1) The number of input points (N): defining the maximum number of points per cluster that are received as an input to the deep neural network.

(2) An optimization algorithm (optimizer): defining an optimization method for the deep neural network (such as Gradient Decent, Moment, Adam).

(3) Learning efficiency (learning_rate): efficiency of an initial update of the deep neural network parameters.

(4) Learning efficiency decay rate (decay_rate): a value used in computation of decay of the learning efficiency.

(5) Learning efficiency decay step (decay_steps): a value used in computation of decay of the learning efficiency.

(6) The number of learning epochs (max_epoch): the number of epochs over which update of the deep neural network parameters is performed.

(7) Batch size (batch_size): the number of data (clusters) that are used in a single update of the deep neural network parameters.

(8) The number of labels (k): the total number of labels including "others".

The deep neural network hyper-parameters above are parameters that are commonly defined in learning of a deep neural network aside from this embodiment, except for the number of input points (N) and the number of labels (k) of the parameters. This embodiment does not limit the way of optimizing the deep neural network and the parameter set can be replaced with other combination of known parameters.

As an example, an update formula for deep neural network parameters is shown in Expression (1), where Gradient Descent is chosen as the optimization algorithm (optimizer):

[Math. 1]

$$\text{global\_step} = \text{batch\_index} \times \text{batch\_size} + \text{current\_epoch} \times M\_1 \quad (1)$$

$$\text{decayed\_learning\_rate} = $$
$$\text{learning\_rate} \times \text{decay\_rate} \, (\text{global\_step} / \text{decay\_steps})$$

$$w\_\{i+1\} = w\_\{i\} - \text{decayed\_learning\_rate} \times \nabla \text{batch\_loss}$$

In Expression (1) above, the batch_index is an index (0, 1, . . . , M_1/batch_size−1) of a batch used for weight update. The current_epoch is the current number of epochs (0, 1, . . . , max_epoch−1). The batch_loss is the total sum of loss of the batch_size number of learning data (loss is a cross entropy of the output of the deep neural network for one data and a one-hot encoded correct label). The w_{i} is the deep neural network parameters after the i-th update.

The deep neural network parameters are data including weights of respective links in the deep neural network and a set of biases. After the end of each epoch, loss (total_loss) of the entire validation data set is evaluated, and the deep neural network parameters when total_loss is minimized are saved as the learned deep neural network parameters 27. Update of the deep neural network parameters is repeated until the max_epoch number of epochs have completed.

Next, structure of the deep neural network used in the learning unit 40 is described. The deep neural network includes the layers (L1 to L13) shown below. Here, "mlp" is an abbreviation for multi-layer perceptron.

(L1) positions & 3d_attribute input layer
(L2) 3d geometric transformation layer
(L3) point_attributes input layer
(L4) mlp layer i
(L5) feature transformation layer
(L6) mlp layer ii
(L7) feature extraction layer
(L8) cluster_attributes input layer
(L9) mlp layer iii
(L10) softmax layer
(L11) label input layer
(L12) one hot encoding layer
(L13) cross entropy layer The multi-layer perceptron is processing that applies single-layer perceptron (hereinafter also called slp) processing multiple times. The slp is processing defined by the number of input channels and the number of output channels. Processing of slp[i, j] is shown in Expression (2), where the number of input channels is i and the number of output channels is j. In Expression (2), the input, input, is an i-dimensional vector. The perceptron weight is a j×i weight matrix. The perceptron bias is a j-dimensional vector. The output, output, is a j-dimensional vector. The activate ( ) represents application of an activation function.

[Math. 2]

$$\text{output} = \text{activate} \, (\text{perception\_weight} \times \text{input} + \text{perception\_bias}) \quad (2)$$

The (L1) to (L13) above conform to a neural network structure described in Non-Patent Literature 2, but processings at (L1), (L2), (L5), (L3), (L7) and (L8) are different from Non-Patent Literature 2.

In the (L1) and (L2) layers in this embodiment, a 3×3-dimensional geometric transformation matrix is derived by a geometric transformation network with (D2) positions and (D5) 3d_attributes as input, and the geometric transformation matrix is integrated with each of (D2) positions and (D5) 3d_attributes such that geometric transformation is performed on each of them. By contrast, the corresponding layers in Non-Patent Literature 2 take only (D2) positions as input, derive a geometric transformation matrix via a geometric transformation network, and integrate the geometric transformation matrix only with the (D2) positions, thereby performing geometric transformation of only the (D2) positions. In this embodiment, explicit input of 3d_attributes enables utilization of features that contribute to identification of a three-dimensional point cloud, such as the normal direction and the direction of extrusion. If such geometrical features are to be acquired solely by deep learning, it is expected that a large amount of learning data will be necessary.

The (L3) layer in this embodiment inputs the (D3) point_attributes to the deep neural network without going through the (L2) 3d geometric transformation layer, whereas the method described in Non-Patent Literature 2 has no corresponding input path.

The (L7) layer in this embodiment performs feature extraction by computation of the total sum of sigmoid function values (hereinafter called sum of sigmoid) and max pooling. The sum of sigmoid is discussed later. Non-Patent Literature 2 performs feature extraction solely by max pooling. Feature extraction solely by max pooling is effective when points having features that can be representative values are present in a point cloud, but is of low accuracy when the points contained in a cluster are homogenous and the number of points having features is low.

The sum of sigmoid is processing that applies a sigmoid function to each element of local_feature and then derives the sum for each of its f dimensions as shown in Expression (3), when the input is local_feature, which is a (N×f)-dimensional tensor representing f-dimensional features for each point.

This processing outputs a f-dimensional vector global_feature. The local_feature is the output of the previous layer. The value f is the dimensions of the output of the previous layer, being an arbitrary value that can be defined as appropriate.

For global_feature, an average in terms of the number of points may be determined by dividing by num_of_points included in the (D4) cluster_attributes.

[Math. 3]

$$\text{global\_feature} = \sum \text{sigmoid (local\_feature} - \text{sigmoid\_bias)} \quad (3)$$

With Expression (3), the number of points indicating a feature can be counted for each of f-dimensional features constituting local_feature. The sigmoid function sigmoid( ) returns a value close to 0 when a value less than 0 is input and returns a value close to 1 when a value equal to or greater than 0 is input. That is, by taking the sum of results of applying a sigmoid, the number of points that indicate values equal to or greater than 0 can be obtained for each of f-dimensional features.

The sigmoid_bias is a scalar equal to or greater than 0 and because local_feature is a value equal to or greater than 0, plays a role of adjusting the value of local_feature so that the value returned by sigmoid ( ) will be an appropriate value. That is, by making adjustment such that a point indicating a feature will be a value equal to or greater than 0 and a value not indicating a feature will be a value less than 0, the sigmoid function value for a point indicating a feature becomes a value close to 1 and the sigmoid function value for a point not indicating a feature becomes a value close to 0. As a result, global_feature as the total sum of sigmoid function values indicates a value close to the number of points that indicate features.

Since feature extraction with max pooling selects only one point that shows the greatest value and constructs a global feature for each of f-dimensional features, feature extraction cannot be performed appropriately when the number of characteristic points that can be representative points is small. In contrast, feature extraction with sum of sigmoid can capture features for the entire point cloud by counting the number of points that have features, and provides improved performance when targeting a point cloud in which representative points do not exist.

In this embodiment, f-dimensional features are divided into f1 and f2 (f=f1+f2). Then, feature extraction is performed on the f1-dimensions with sum of sigmoid and feature extraction is performed on the f2-dimensions with max pooling. By combining two feature extraction methods, both an overall feature and the features of representative points are extracted. By setting f2=0, feature extraction only with sum of sigmoid may be performed.

In this embodiment, feature extractions are also performed with sum of sigmoid and max pooling for the geometric transformation network used in (L2) and (L5). By contrast, Non-Patent Literature 2 performs feature extraction only with max pooling in a geometric transformation network.

The (L8) layer in this embodiment inputs (D4) cluster_attributes to the deep neural network without going through the layers up to (L7), whereas the technique described in Non-Patent Literature 2 has no corresponding input path and cluster_attributes is not input.

Figure 3:
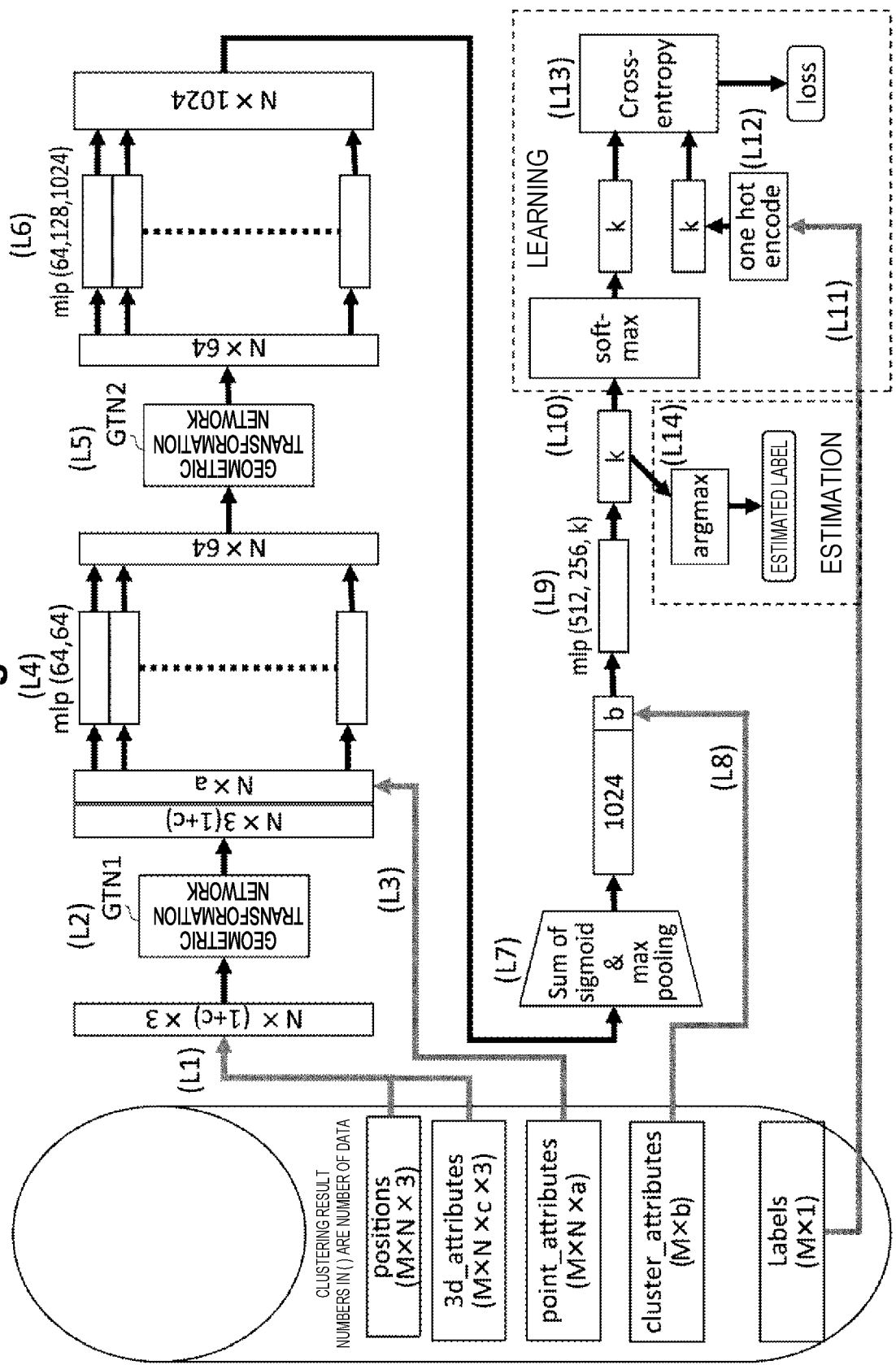
FIG. 3 is a conceptual diagram showing an exemplary structure of a deep neural network according to an embodiment.

Now referring to FIG. 3, processing in each layer of the deep neural network is described. FIG. 3 shows an example of the structure of the deep neural network according to this embodiment. In the example shown in FIG. 3, only the number of output channels is indicated for mlp. Also, this embodiment is not limited to the example shown in FIG. 3; the number of layers and the number of channels of mlp, which is a component of each layer, may be varied. Further, although processing for one cluster is described in FIG. 3 in order to avoid complexity, in practice, clusters as many as the number of batch_size are input at a time and processed at a time.

The positions & 3d_attributes input layer (L1) is a layer for inputting positions and 3d_attributes, which are three-dimensional information included in a clustering result. When N or more points are contained in the cluster, input is terminated at N points. When the number of points contained in the cluster is less than N, both positions and 3d_attributes are input as a value of 0 for lacking data. Accordingly, the number of data that are input in this layer, transform_input_i, is N×(1+c)×3(=N×3+N×c×3).

Next, processing in the 3d geometric transformation layer (L2) is described with reference to FIG. 4. FIG. 4 shows an example of structure of a geometric transformation network, being a portion of the deep neural network according to this embodiment.

In the 3d geometric transformation layer (L2), the value of d is (1+c) and the value of K is 3 in FIG. 4 because the number of channels for input data is three. First, N×(1+c)×3-dimensional input data (transform_input_i) is processed with mlp (slp[(1+c)×3, 64], slp[64, 128], slp[128, 1024]), obtaining N×1024-dimensional intermediate output 1. Feature extraction is performed on the intermediate output 1 with sum of sigmoid and max pooling, thus obtaining an intermediate output 2 as a 1024-dimensional vector. The intermediate output 2 is processed with mlp (slp[1024, 512], slp[512, 256]) to obtain a 256-dimensional intermediate output 3 (transform_feature_i). This is subjected to a matrix operation according to Expression (4) using a 3×256-dimensional weights (transform_weight_i) and 3×3-dimensional biases (transform_biases_i). This results in a 3×3-dimensional transform_matrix_i.

[Math. 4]

$$\text{transform\_matrix\_i} = \quad (4)$$
$$\text{transform\_weight\_i} \times \text{transform\_feature\_i} + \text{transform\_biases\_i}$$

Then, a matrix operation is performed according to Expression (5) using transform_matrix_i to obtain transform_output_i, which is the output of this layer. Here, transform_output_i is N×(1+c)×3 dimension.

[Math. 5]

$$\text{transform\_output\_i} = \text{transform\_input\_i} \times \text{transform\_matrix\_i} \quad (5)$$

Then, turning back to FIG. 3, the point_attributes input layer (L3) inputs the point_attributes included in the clustering result to the deep neural network. The point_attributes input layer (L3) reduces the N×(1+c)×3-dimensional transform_output_i in dimension to N×(3(1+c)) dimensions and concatenates N×a-dimensional point_attributes with it, thus outputting an N×(3(1+c)+a)-dimensional concatenated_output_i.

The mlp layer i (L4) processes the N×(3(1+c)+a)-dimensional concatenated_output_i with mlp (slp[(3(1+c)+a), 64], slp [64, 64]) to obtain N×64-dimensional mlp_output_i.

Now referring to FIG. 4, processing in the feature transformation layer (L5) is described. In the feature transformation layer (L5), the value of d is 1 and the value of K is 64 in FIG. 4 because the number of channels for input data is 64. According to FIG. 4, the input is N×1×64 dimensions, but the dimensions of the input are assumed as N×64 because "1" of a first dimension can be omitted. First, N×64-dimensional input data (mlp_output_i) is processed with mlp (slp[64, 64], slp[64, 128], slp[128, 1024]), obtaining an N×1024-dimensional intermediate output 1. Feature extraction is performed on the intermediate output 1 with sum of sigmoid and max pooling to obtain an intermediate output 2 as a 1024-dimensional vector. The intermediate output 2 is processed with mlp (slp[1024, 512], slp[512, 256]) to obtain a 256-dimensional intermediate output 3 (transform_feature_ii). This is subjected to a matrix operation according to Expression (6) shown below using 64×256-dimensional weights (transform_weight_ii) and 64×64-dimensional biases (transform_biases_ii). This results in a 64×64-dimensional transform_matrix_ii.

[Math. 6]

$$transform\_matrix\_ii = \\ transform\_weight\_ii \times transform\_feature\_ii + transform\_biases\_ii \quad (6)$$

Next, a matrix operation is performed according to Expression (7) using transform_matrix_ii to obtain transform_output_ii, which is the output of this layer.

[Math. 7]

$$transform\_output\_ii = mlp\_output\_i \times transform\_matrix\_ii \quad (7)$$

Then, turning back to FIG. 3, the mlp layer ii (L6) processes the N×64-dimensional transform_output_ii with mlp (slp[64, 64], slp[64, 128], slp[128, 1024]) to obtain an N×1024-dimensional mlp_output_ii.

The feature extraction layer (L7) performs feature extraction on the N×1024-dimensional mlp_output_ii with sum of sigmoid and max pooling, thus obtaining 1×1024-dimensional global_feature.

The cluster_attributes input layer (L8) concatenates the 1×1024-dimensional global_feature with 1×b-dimensional cluster_attributes, thus outputting an 1×(1024+b)-dimensional concatenated_output_ii.

The mlp layer iii (L9) processes the 1×(1024+b)-dimensional concatenated_output_ii with mlp (slp[(1024+b), 512], slp[512, 256], slp[256, k]) to obtain a 1×k-dimensional mlp_output_iii.

The softmax layer (L10) applies softmax calculation to the 1×k-dimensional mlp_output_iii, thus outputting a 1×k-dimensional softmax_output.

The label input layer (L11) inputs the label included in the clustering result. One hot encode processing is executed on the respective label values being integer values of 0, 1, . . . , k−1 in the one hot encoding layer (L12), and an 1×k-dimensional label_input is output.

The cross entropy layer (L13) calculates the cross entropy of the softmax_output from the softmax layer (L10) and the label_input from the one hot encoding layer (L12) and computes loss.

The total sum of loss computed in the final layer described above is determined for the batch_size number of clusters to compute batch_loss. Update of the deep neural network parameters with an optimizer which is applied with batch_loss is performed. The update formula for gradient descent as the optimizer is as shown in Expression (2) discussed above.

Next, a three-dimensional point cloud label estimation device that performs label estimation for a three-dimensional point cloud using a learning result from the three-dimensional point cloud label learning device 10L is described.

As shown in FIG. 2B, a three-dimensional point cloud label estimation device 10E in estimation does not use the learning unit 40 and the learning point cloud labels 22.

The clustering unit 30 according to this embodiment, during estimation, takes as input the three-dimensional point cloud 21 and the clustering parameters 23 (procedural steps P21 and P22), clusters (divides) the three-dimensional point cloud into multiple clusters (regions), and outputs the unlabeled clustering result 25 including the third-dimensional points constituting a cluster and attributes of each point such as the normal for each of the clusters resulting from clustering (procedural step P23). That is, the unlabeled clustering result 25 includes the (D1) to (D5) described above and not include (D6).

The estimation unit 50 according to this embodiment takes as input the unlabeled clustering result 25, the deep neural network hyper-parameters 26 and the learned deep neural network parameters 27 (procedural steps P24, P25 and P26), derives estimated labels for each of the clusters using a deep neural network, and outputs the estimated-labeled three-dimensional point cloud 28 with the derived estimated labels assigned (procedural step P27). The estimated-labeled three-dimensional point cloud 28 is the final output of the three-dimensional point cloud label estimation device 10E.

Next, the structure of the deep neural network used in the estimation unit 50 is described with reference to FIG. 3, described earlier. The estimation unit 50 acquires estimation result labels by processing clusters with a deep neural network including the layers shown below (L1 to L9, L14). As the layers L1 to L9 are similar to ones in the deep neural network described for the learning unit 40 above, their descriptions are omitted.

(L1) positions & 3d_attributes input layer
(L2) 3d geometric transformation layer
(L3) point_attributes input layer
(L4) mlp layer i
(L5) feature transformation layer
(L6) mlp layer ii
(L7) feature extraction layer
(L8) cluster_attributes input layer
(L9) mlp layer iii
(L14) argmax layer The argmax layer (L14) applies argmax processing to 1×k-dimensional mlp_output_iii to obtain an index of the maximum value. This index makes an estimated label.

For a cluster for which an estimated label has been derived as described above, estimated labels are assigned to three-dimensional points contained in the cluster. Similar processing is performed on all the clusters and a set of three-dimensional points with estimated labels assigned is output as the estimated-labeled three-dimensional point cloud 28.

Figure 5A:
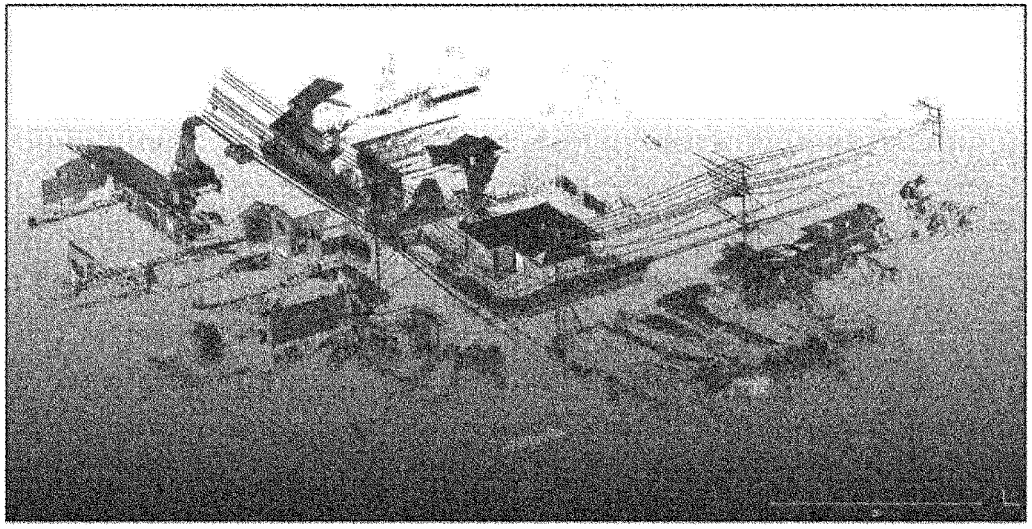
FIG. 5A is a conceptual diagram showing an example of a three-dimensional point cloud.
Figure 5B:
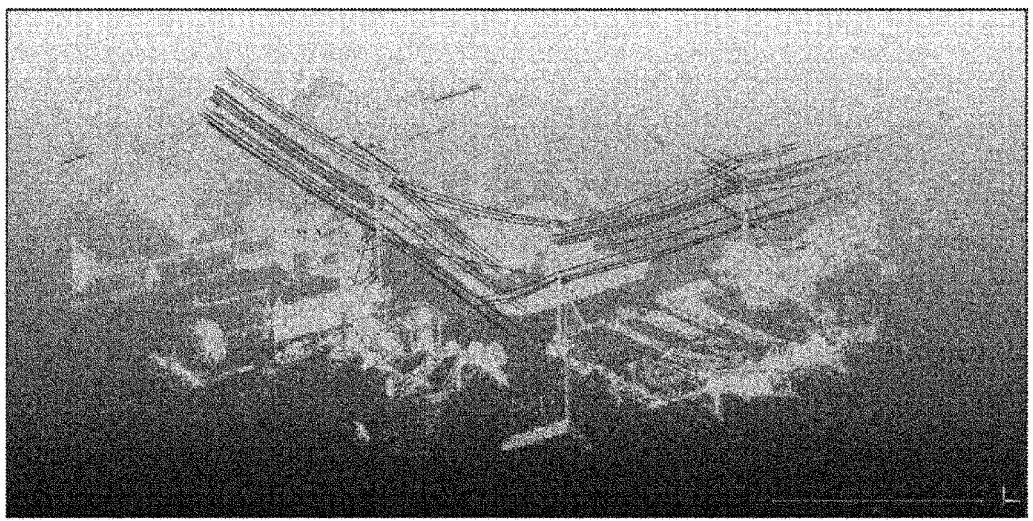
FIG. 5B is a conceptual diagram illustrating a result of learning only cables and assigning labels when the three-dimensional point cloud illustrated in FIG. 5A is input.

An example of a label estimation result according to this embodiment is shown in FIG. 5B. FIG. 5B is a result of learning only cables and assigning labels when the three-dimensional point cloud illustrated in FIG. 5A is input. In FIG. 5B, points assigned labels are represented in dark color. A label estimation result may be used in a navigation system for detection of objects such as obstacles, for example.

The configuration of the three-dimensional point cloud label learning and estimation device 10 described in the above embodiment is an example and may be modified within the scope of the invention. The processing described in the above embodiment is also an example; unnecessary processing may be removed, new processing may be added, or an order of processing may be rearranged within the scope of the invention.

The embodiment may be implemented in hardware, in software that is installed into general-purpose hardware, or in a combination of hardware and software, for example.

Figure 6:
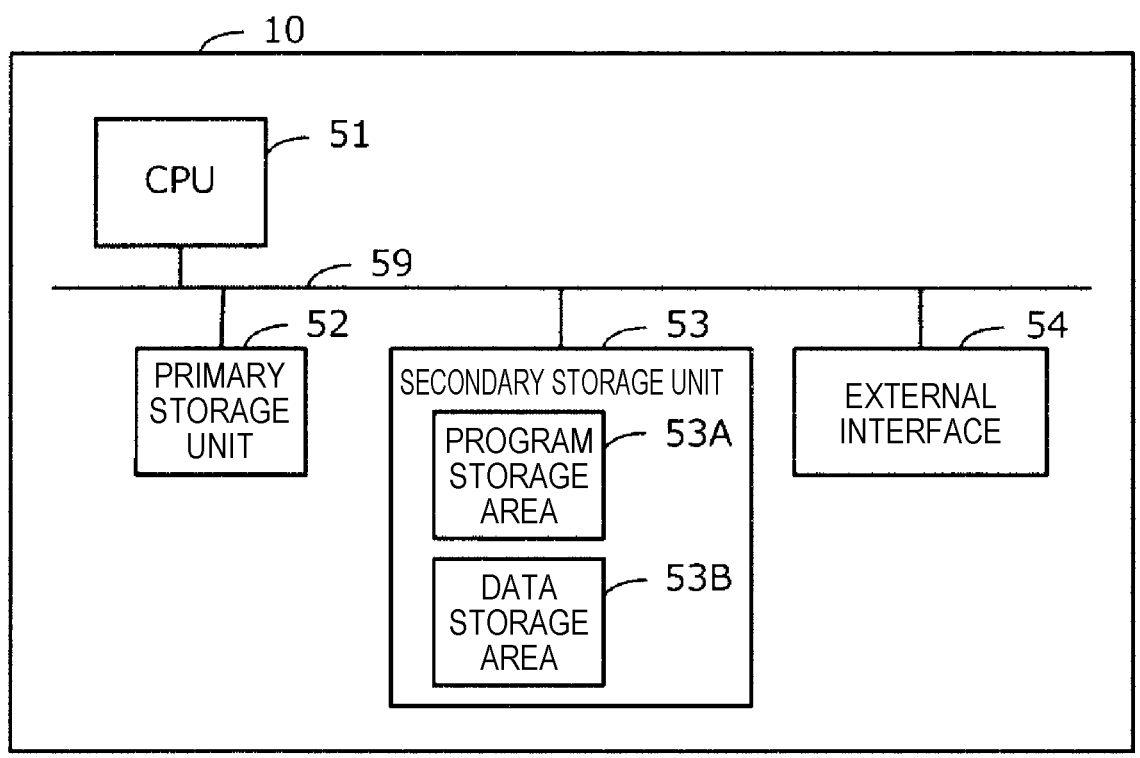
FIG. 6 is a block diagram showing an example of electrical configuration of a three-dimensional point cloud label learning and estimation device according to an embodiment.

FIG. 6 is a block diagram showing an example of electrical configuration of the three-dimensional point cloud label learning and estimation device 10. The three-dimensional point cloud label learning and estimation device 10 includes a CPU (Central Processing Unit) 51, a primary storage unit 52, and a secondary storage unit 53. The CPU 51 is an example of a hardware processor. The CPU 51, the primary storage unit 52 and the secondary storage unit 53 are interconnected via a bus 59. The three-dimensional point cloud label learning and estimation device 10 may include a GPU (Graphics Processing Unit) in addition to the CPU.

The primary storage unit 52 is a volatile memory such as RAM (Random Access Memory). The secondary storage unit 53 is a nonvolatile memory such as an HDD (Hard Disk Drive) or an SSD (Solid State Drive).

The secondary storage unit 53 includes a program storage area 53A and a data storage area 53B. The program storage area 53A stores programs such as a three-dimensional point cloud label learning and estimation program as an example. The program storage area 53A may be a nonvolatile memory such as ROM (Read Only Memory). The data storage area 53B functions as the storage unit 20, for example.

The CPU 51 reads the three-dimensional point cloud label learning and estimation program from the program storage area 53A and loads it into the primary storage unit 52. The CPU 51 operates as the clustering unit 30, the learning unit 40 and the estimation unit 50 of FIG. 1 by loading and executing the three-dimensional point cloud label learning and estimation program.

Three-dimensional point cloud label learning and estimation processing that is executed by the CPU by reading and executing software (a program) may be performed by various processors other than a CPU. Such processors can include a PLD (Programmable Logic Device) such as an FPGA (Field-Programmable Gate Array) that allows a change to circuit configuration after manufacturing, a dedicated electric circuit as a processor having a circuit configuration specifically designed for execution of specific processing, such as an ASIC (Application Specific Integrated Circuit) and the like. Also, the three-dimensional point cloud label learning and estimation processing may be executed by one of these various processors or by a combination of two or more processors of the same type or different types (e.g., multiple FPGAs, a combination of a CPU and a FPGA, etc.). The hardware structures of such various processors are more specifically electric circuits combining circuit elements such as semiconductor devices.

Although the embodiments above described an aspect where the three-dimensional point cloud label learning and estimation processing program is previously stored (installed) in the program storage area 53A, the present invention is not limited to it. The program may be provided in a form of being stored in a non-transitory storage medium, such as CD-ROM (Compact Disc Read Only Memory), DVD-ROM (Digital Versatile Disc Read Only Memory), and USB (Universal Serial Bus) memory. The program may also be downloaded from an external device over a network.

In connection with the embodiments above, further appendices are disclosed:

(Appendix 1) A three-dimensional point cloud label learning and estimation device including:
 a memory; and
 at least one processor connected with the memory,
 wherein the processor is configured to:
 cluster a three-dimensional point cloud into clusters;
 make a neural network learn to estimate a label corresponding to an object to which points contained in each of the clusters belong; and
 estimate a label for the cluster using the learned neural network learned,
 wherein the neural network uses a total sum of sigmoid function values (sum of sigmoid) when performing feature extraction on the cluster.

(Appendix 2) A non-transitory storage medium storing a program executable by a computer to execute three-dimensional point cloud label learning and estimation processing, the three-dimensional point cloud label learning and estimation processing including:
 clustering a three-dimensional point cloud into clusters;
 making a neural network learn to estimate a label corresponding to an object to which points contained in each of the clusters belong; and
 estimating a label for the cluster using the learned neural network,
 wherein the neural network uses a total sum of sigmoid function values (sum of sigmoid) when performing feature extraction on the cluster.

The invention claimed is:

1. A three-dimensional point cloud label learning and estimation device comprising:
 a cluster generator configured to cluster a three-dimensional point cloud into clusters;
 a learner configured to cause a neural network to learn to estimate a label corresponding to an object to which points contained in each of the clusters belong; and
 an estimator configured to estimate a label for the cluster using the neural network learned at the learning unit, wherein the neural network uses a total sum of sigmoid function values when performing feature extraction on the cluster, wherein
 during learning, the cluster generator outputs a labeled clustering result by performing clustering on a three-dimensional point cloud with application of learning point cloud labels and clustering parameters, the learning point cloud labels being labels previously assigned to respective points in the three-dimensional point cloud, and during estimation, the cluster generator performs clustering on a target three-dimensional point cloud with application of the clustering parameters and outputs an unlabeled clustering result,
 the learner uses the labeled clustering result and deep neural network hyper-parameters to learn label estimation parameters for estimating labels to be assigned to respective clusters that result from the clustering at the cluster generator, and outputs learned deep neural network parameters, and
 the estimator estimates a label for each cluster in the unlabeled clustering result by using the unlabeled clustering result, the deep neural network hyper-parameters, and the learned deep neural network parameters output by the learner.

2. The three-dimensional point cloud label learning and estimation device according to claim 1, wherein
the cluster generator outputs three-dimensional attribute information for the points contained in the cluster and attribute information for a scalar of the cluster, and
the neural network is configured to:
use the three-dimensional attribute information for the points contained in the cluster and the attribute information for the scalar of the cluster as input information, and
subject the three-dimensional attribute information for the points contained in the cluster to geometric transformation.

3. The three-dimensional point cloud label learning and estimation device according to claim 2, wherein the three-dimensional attribute information is a normal direction and a direction of extrusion of each of the points contained in the cluster.

4. The three-dimensional point cloud label learning and estimation device according to claim 2, wherein
during learning, the cluster generator outputs a labeled clustering result by performing clustering on a three-dimensional point cloud with application of learning point cloud labels and clustering parameters, the learning point cloud labels being labels previously assigned to respective points in the three-dimensional point cloud, and during estimation, the cluster generator performs clustering on a target three-dimensional point cloud with application of the clustering parameters and outputs an unlabeled clustering result,
the learner uses the labeled clustering result and deep neural network hyper-parameters to learn label estimation parameters for estimating labels to be assigned to respective clusters that result from the clustering at the cluster generator, and outputs learned deep neural network parameters, and
the estimator estimates a label for each cluster in the unlabeled clustering result by using the unlabeled clustering result, the deep neural network hyper-parameters, and the learned deep neural network parameters output by the learner.

5. The three-dimensional point cloud label learning and estimation device according to claim 3, wherein
during learning, the cluster generator outputs a labeled clustering result by performing clustering on a three-dimensional point cloud with application of learning point cloud labels and clustering parameters, the learning point cloud labels being labels previously assigned to respective points in the three-dimensional point cloud, and during estimation, the cluster generator performs clustering on a target three-dimensional point cloud with application of the clustering parameters and outputs an unlabeled clustering result,
the learner uses the labeled clustering result and deep neural network hyper-parameters to learn label estimation parameters for estimating labels to be assigned to respective clusters that result from the clustering at the cluster generator, and outputs learned deep neural network parameters, and
the estimator estimates a label for each cluster in the unlabeled clustering result by using the unlabeled clustering result, the deep neural network hyper-parameters, and the learned deep neural network parameters output by the learner.

6. A three-dimensional point cloud label learning and estimation device comprising:
a cluster generator configured to cluster a three-dimensional point cloud into clusters;
a learner configured to cause a neural network to learn to estimate a label corresponding to an object to which points contained in each of the clusters belong; and
an estimator configured to estimate a label for the cluster using the neural network learned at the learner,
wherein the cluster generator outputs three-dimensional attribute information for the points contained in the cluster and attribute information for a scalar of the cluster, and
the neural network is configured to:
take as input the three-dimensional attribute information for the points contained in the cluster and the attribute information for a scalar of the cluster output by the cluster generator, and
subject the three-dimensional attribute information for the points contained in the cluster to geometric transformation, wherein
during learning, the cluster generator outputs a labeled clustering result by performing clustering on a three-dimensional point cloud with application of learning point cloud labels and clustering parameters, the learning point cloud labels being labels previously assigned to respective points in the three-dimensional point cloud, and during estimation, the cluster generator performs clustering on a target three-dimensional point cloud with application of the clustering parameters and outputs an unlabeled clustering result,
the learner uses the labeled clustering result and deep neural network hyper-parameters to learn label estimation parameters for estimating labels to be assigned to respective clusters that result from the clustering at the cluster generator, and outputs learned deep neural network parameters, and
the estimator estimates a label for each cluster in the unlabeled clustering result by using the unlabeled clustering result, the deep neural network hyper-parameters, and the learned deep neural network parameters output by the learner.

7. The three-dimensional point cloud label learning and estimation device according to claim 6, wherein
the cluster generator outputs three-dimensional attribute information for the points contained in the cluster and attribute information for a scalar of the cluster, and
the neural network is configured to:
use the three-dimensional attribute information for the points contained in the cluster and the attribute information for the scalar of the cluster as input information, and
subject the three-dimensional attribute information for the points contained in the cluster to geometric transformation.

8. The three-dimensional point cloud label learning and estimation device according to claim 7, wherein
the three-dimensional attribute information is a normal direction and a direction of extrusion of each of the points contained in the cluster.

9. The three-dimensional point cloud label learning and estimation device according to claim 7, wherein
during learning, the cluster generator outputs a labeled clustering result by performing clustering on a three-dimensional point cloud with application of learning point cloud labels and clustering parameters, the learning point cloud labels being labels previously assigned to respective points in the three-dimensional point cloud, and during estimation, the cluster generator performs clustering on a target three-dimensional point cloud with application of the clustering parameters and outputs an unlabeled clustering result, the learner uses the labeled clustering result and deep neural network hyper-parameters to learn label estimation parameters for estimating labels to be assigned to respective clusters that result from the clustering at the cluster generator, and outputs learned deep neural network parameters, and the estimator estimates a label for each cluster in the unlabeled clustering result by using the unlabeled clustering result, the deep neural network hyper-parameters, and the learned deep neural network parameters output by the learner.

10. The three-dimensional point cloud label learning and estimation device according to claim 8, wherein during learning, the cluster generator outputs a labeled clustering result by performing clustering on a three-dimensional point cloud with application of learning point cloud labels and clustering parameters, the learning point cloud labels being labels previously assigned to respective points in the three-dimensional point cloud, and during estimation, the cluster generator performs clustering on a target three-dimensional point cloud with application of the clustering parameters and outputs an unlabeled clustering result, the learner uses the labeled clustering result and deep neural network hyper-parameters to learn label estimation parameters for estimating labels to be assigned to respective clusters that result from the clustering at the cluster generator, and outputs learned deep neural network parameters, and the estimator estimates a label for each cluster in the unlabeled clustering result by using the unlabeled clustering result, the deep neural network hyper-parameters, and the learned deep neural network parameters output by the learner.

11. A computer-implemented method for learning and estimating a three-dimensional point cloud label, the method comprising:

clustering, by a cluster generator, a three-dimensional point cloud into clusters;

causing, by a learner, a neural network to learn to estimate a label corresponding to an object to which points contained in each of the clusters belong; and estimating, by an estimator, a label for the cluster using the learned neural network, wherein the neural network uses a total sum of sigmoid function values when performing feature extraction on the cluster, wherein during learning, the cluster generator outputs a labeled clustering result by performing clustering on a three-dimensional point cloud with application of learning point cloud labels and clustering parameters, the learning point cloud labels being labels previously assigned to respective points in the three-dimensional point cloud, and during estimation, the cluster generator performs clustering on a target three-dimensional point cloud with application of the clustering parameters and outputs an unlabeled clustering result, the learner uses the labeled clustering result and deep neural network hyper-parameters to learn label estimation parameters for estimating labels to be assigned to respective clusters that result from the clustering at the cluster generator, and outputs learned deep neural network parameters, and the estimator estimates a label for each cluster in the unlabeled clustering result by using the unlabeled clustering result, the deep neural network hyper-parameters, and the learned deep neural network parameters output by the learner.

12. The computer-implemented method according to claim 11, the cluster generator outputs three-dimensional attribute information for the points contained in the cluster and attribute information for a scalar of the cluster, and the neural network is configured to:

use the three-dimensional attribute information for the points contained in the cluster and the attribute information for the scalar of the cluster as input information, and subject the three-dimensional attribute information for the points contained in the cluster to geometric transformation.

13. The computer-implemented method according to claim 12, wherein the three-dimensional attribute information is a normal direction and a direction of extrusion of each of the points contained in the cluster.

14. The computer-implemented method according to claim 12, wherein during learning, the cluster generator outputs a labeled clustering result by performing clustering on a three-dimensional point cloud with application of learning point cloud labels and clustering parameters, the learning point cloud labels being labels previously assigned to respective points in the three-dimensional point cloud, and during estimation, the cluster generator performs clustering on a target three-dimensional point cloud with application of the clustering parameters and outputs an unlabeled clustering result, the learner uses the labeled clustering result and deep neural network hyper-parameters to learn label estimation parameters for estimating labels to be assigned to respective clusters that result from the clustering at the cluster generator, and outputs learned deep neural network parameters, and the estimator estimates a label for each cluster in the unlabeled clustering result by using the unlabeled clustering result, the deep neural network hyper-parameters, and the learned deep neural network parameters output by the learner.

15. The computer-implemented method according to claim 13, wherein during learning, the cluster generator outputs a labeled clustering result by performing clustering on a three-dimensional point cloud with application of learning point cloud labels and clustering parameters, the learning point cloud labels being labels previously assigned to respective points in the three-dimensional point cloud, and during estimation, the cluster generator performs clustering on a target three-dimensional point cloud with application of the clustering parameters and outputs an unlabeled clustering result, the learner uses the labeled clustering result and deep neural network hyper-parameters to learn label estimation parameters for estimating labels to be assigned to respective clusters that result from the clustering at the cluster generator, and outputs learned deep neural network parameters, and the estimator estimates a label for each cluster in the unlabeled clustering result by using the unlabeled clustering result, the deep neural network hyper-parameters, and the learned deep neural network parameters output by the learner.

\* \* \* \* \*